United States Patent
Hopkins

(10) Patent No.: US 10,362,343 B2
(45) Date of Patent: Jul. 23, 2019

(54) APPARATUS, METHOD AND COMPUTER PROGRAM

(71) Applicants: Sony Corporation, Tokyo (JP); Sony Europe Limited, Weybridge (GB)

(72) Inventor: Huw Hopkins, Basingstoke (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 0 days.

(21) Appl. No.: 15/403,533

(22) Filed: Jan. 11, 2017

(65) Prior Publication Data
US 2017/0264922 A1    Sep. 14, 2017

(30) Foreign Application Priority Data

Mar. 11, 2016 (GB) .................................. 1604180.8

(51) Int. Cl.
| | |
|---|---|
| *H04N 7/173* | (2011.01) |
| *H04N 21/235* | (2011.01) |
| *G06F 16/22* | (2019.01) |
| *G06F 16/48* | (2019.01) |
| *H04N 21/436* | (2011.01) |
| *H04N 21/84* | (2011.01) |

(52) U.S. Cl.
CPC ......... *H04N 21/2353* (2013.01); *G06F 16/22* (2019.01); *G06F 16/48* (2019.01); *H04N 21/436* (2013.01); *H04N 21/84* (2013.01)

(58) Field of Classification Search
CPC ............................ H04N 21/2353; H04N 21/84
USPC ....................................................... 725/115
See application file for complete search history.

(56) References Cited

U.S. PATENT DOCUMENTS

| | | | |
|---|---|---|---|
| 6,543,051 B1* | 4/2003 | Manson | G08B 27/008 348/461 |
| 6,684,240 B1* | 1/2004 | Goddard | H04N 7/163 348/E7.061 |
| 7,602,277 B1* | 10/2009 | Daly | G08B 27/006 340/438 |
| 7,643,564 B2* | 1/2010 | Sheynman | H04L 63/10 375/259 |
| 7,681,215 B2* | 3/2010 | Kim | H04H 20/59 340/286.02 |
| 7,870,279 B2* | 1/2011 | Chuang | H04L 29/06 709/203 |

(Continued)

FOREIGN PATENT DOCUMENTS

| | | |
|---|---|---|
| KR | 20090061516 | 6/2009 |
| WO | WO 2010/001484 A1 | 1/2010 |
| WO | WO 2015/144243 A1 | 10/2015 |

OTHER PUBLICATIONS

Partial European Search Report dated Jun. 26, 2017 in Patent Application No. 17153357.3.

(Continued)

*Primary Examiner* — Michael B. Pierorazio
(74) *Attorney, Agent, or Firm* — Oblon, McClelland, Maier & Neustadt, L.L.P.

(57) ABSTRACT

An information processing apparatus comprising: receiver circuitry configured to receive content including metadata; storage containing a parameter associated with the metadata; and control circuitry configured to: extract the received metadata; retrieve the parameter associated with the metadata and control the information processing apparatus based on the parameter.

18 Claims, 7 Drawing Sheets

(56) References Cited

U.S. PATENT DOCUMENTS

| | | | |
|---|---|---|---|
| 8,745,655 B2* | 6/2014 | Reddy | H04N 21/25841 725/31 |
| 9,106,976 B2* | 8/2015 | Emerson | G11B 27/034 |
| 2001/0021994 A1* | 9/2001 | Nash | G06Q 30/02 725/42 |
| 2002/0067436 A1 | 6/2002 | Shirahama et al. | |
| 2002/0083468 A1* | 6/2002 | Dudkiewicz | H04N 21/4755 725/133 |
| 2002/0124252 A1* | 9/2002 | Schaefer | H04N 7/17318 725/33 |
| 2002/0129368 A1* | 9/2002 | Schlack | G06Q 30/02 725/46 |
| 2002/0188944 A1* | 12/2002 | Noble | H04N 5/44543 725/39 |
| 2002/0188949 A1* | 12/2002 | Wang | H04N 5/44543 725/46 |
| 2003/0018977 A1* | 1/2003 | McKenna | H04N 5/44543 725/115 |
| 2003/0066069 A1* | 4/2003 | Mankovich | H04N 7/163 725/9 |
| 2003/0216133 A1* | 11/2003 | Poltorak | G08B 27/006 455/404.1 |
| 2005/0036069 A1 | 2/2005 | Lee et al. | |
| 2005/0055685 A1* | 3/2005 | Maynard | G06F 8/65 717/170 |
| 2005/0086685 A1* | 4/2005 | Rahman | H04L 29/06 725/33 |
| 2006/0234672 A1* | 10/2006 | Adler | G08B 27/003 455/404.1 |
| 2007/0047520 A1* | 3/2007 | Byers | H04M 3/42357 370/352 |
| 2007/0121651 A1* | 5/2007 | Casey | G06F 17/30017 370/401 |
| 2007/0150273 A1* | 6/2007 | Yamamoto | G10L 15/22 704/231 |
| 2007/0216538 A1 | 9/2007 | Thelen et al. | |
| 2007/0280446 A1* | 12/2007 | Hsieh | H04L 12/66 379/93.23 |
| 2008/0134043 A1* | 6/2008 | Georgis | G06F 17/30035 715/733 |
| 2009/0150925 A1* | 6/2009 | Henderson | H04N 7/163 725/34 |
| 2009/0158382 A1* | 6/2009 | Shaffer | H04H 20/57 725/131 |
| 2009/0217324 A1* | 8/2009 | Massimi | H04H 20/106 725/46 |
| 2009/0239497 A1* | 9/2009 | Sennett | H04W 4/22 455/404.1 |
| 2009/0247110 A1* | 10/2009 | Sennett | G08B 27/006 455/404.1 |
| 2009/0247114 A1* | 10/2009 | Sennett | H04W 4/22 455/404.1 |
| 2009/0247116 A1* | 10/2009 | Sennett | H04M 11/04 455/404.2 |
| 2009/0290065 A1 | 11/2009 | Asayama et al. | |
| 2009/0300695 A1* | 12/2009 | White | H04N 5/76 725/109 |
| 2010/0058395 A1* | 3/2010 | Goergen | H04N 7/17318 725/58 |
| 2010/0060789 A1* | 3/2010 | Aoki | G09G 5/14 348/563 |
| 2010/0186029 A1* | 7/2010 | Kim | G08B 27/005 725/33 |
| 2011/0088058 A1* | 4/2011 | Velazquez | H04H 20/59 725/33 |
| 2011/0125787 A1 | 5/2011 | Choi et al. | |
| 2011/0126251 A1* | 5/2011 | LaFreniere | H04N 7/17327 725/110 |
| 2011/0126257 A1* | 5/2011 | Goergen | H04N 7/17318 725/132 |
| 2011/0131604 A1* | 6/2011 | Van Hoff | G06F 3/0481 725/38 |
| 2012/0102522 A1* | 4/2012 | Long | H04W 76/007 725/33 |
| 2013/0274936 A1* | 10/2013 | Donahue | G06Q 50/06 700/291 |
| 2013/0281047 A1* | 10/2013 | Daly | H04W 4/22 455/404.1 |
| 2014/0148116 A1* | 5/2014 | Alman | H04W 4/22 455/404.1 |
| 2014/0244997 A1* | 8/2014 | Goel | H04W 12/08 713/155 |

OTHER PUBLICATIONS

Jiani Liu, et al. "A multi-control center household appliances coordinated control method based on events and actions" Third International Conference on Cyberspace Technology, XP055321938, Jan. 1, 2015, 4 Pages.

Extended European Search Report dated Sep. 27, 2017 in Patent Application No. 17153357.3.

* cited by examiner

APPARATUS, METHOD AND COMPUTER PROGRAM

CROSS REFERENCE TO RELATED APPLICATIONS

The present application claims priority to United Kingdom Application 1604180.8 filed on 11 Mar. 2016, contents of which being incorporated herein by reference in its entirety.

BACKGROUND

The present disclosure relates generally, but not exclusively, to an apparatus, method and computer program.

BACKGROUND TO THE DISCLOSURE

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Multimedia content such as broadcast video and/or audio or audio and video data streamed over the Internet contains metadata that relates to the content of the multimedia data. This includes MHEG data and links, HbbTV data links, broadcast metadata for example DVB-SI, network services supplied metadata such as the YouTube genre, and content file metadata.

This metadata is used to highlight certain sections in EPGs and maybe provide accessibility information such as subtitles to people who are hard of hearing.

However, it is an aim of the present disclosure to further enhance the user's experience of the content by using the metadata received with the content.

SUMMARY

According to embodiments of the disclosure there is provided, an information processing apparatus comprising: receiver circuitry configured to receive content including metadata; storage containing a parameter associated with the metadata; and control circuitry configured to: extract the received metadata; retrieve the parameter associated with the metadata and control the information processing apparatus based on the parameter.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Embodiments of the present disclosure will now be described by way of example only and with reference to the accompanying drawings, in which:

FIGS. 3-1 to 3-3 show a graphical user interface for the information processing apparatus of FIG. 2;

DESCRIPTION OF THE EMBODIMENTS

Figure 1:
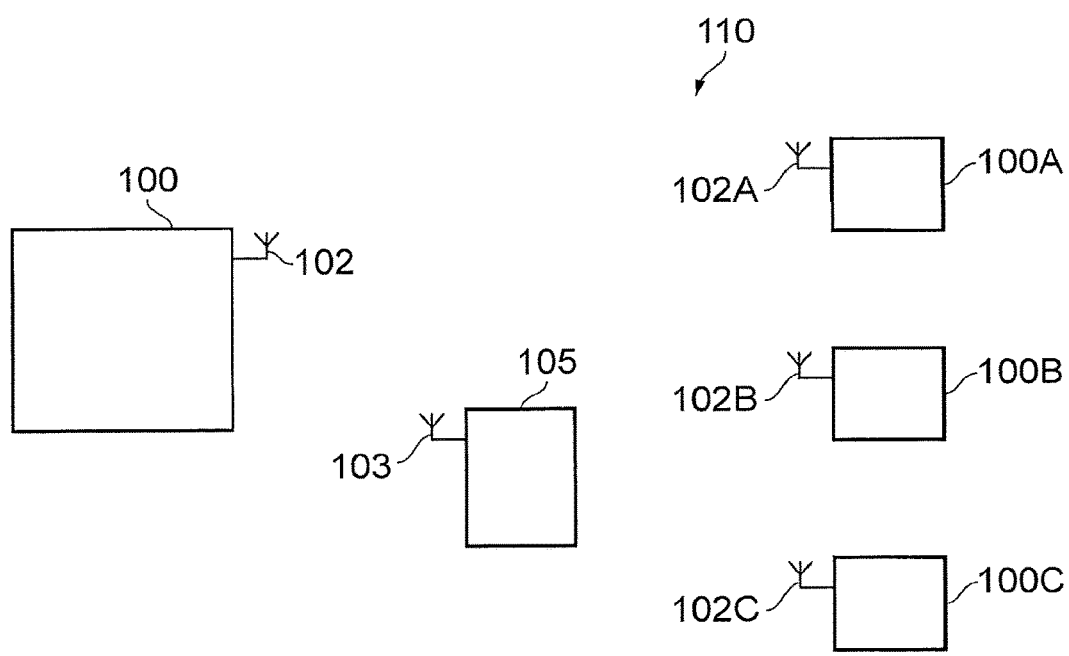
FIG. 1 shows a system according to embodiments of the disclosure.

FIG. 1 shows a system 110 according to the present disclosure. The system 110 includes one or more information processing apparatus 100. The information processing apparatus 100 communicates wirelessly in the system using antenna 102. Within the system, a hub 105 is provided. The hub includes hub antenna 103. The information processing apparatus 100 may communicate with one or more other information processing apparatuses 100A-100C directly in a peer to peer type arrangement or may communicate with the other information processing apparatuses via hub 105. In other words, the hub 105 may act as a relay between information processing apparatus 100 and the other information processing apparatuses 100A-100C. Moreover, hub 105 may be connected to the Internet and may act as a repository for information about each of the information processing apparatuses in the network 110. This repository may be stored locally on the hub or the over the internet and on the cloud. An example of the hub is the Sony Xperia Agent®. Further, an example of information processing apparatus 100 is a television with Internet of Things (IoT) functionality. The other information processing apparatuses may include a fridge in information processing apparatus 100A. The fridge is an example of a food storage receptacle. Other examples of food storage receptacles include a food storage cupboard, a larder or a freezer. A further example of an information processing apparatus 100B is a smart light. A smart light is an IoT capable device that can be controlled over a network remotely. A third example of an information processing apparatus 100C is a curtain controller which is an IoT enabled device which allows the curtains to be opened and closed using commands received remotely. The other information processing apparatuses 100A-100C communicate with either the hub 105 or the information processing apparatus 100 directly using respective antennas 102A-102C.

Figure 2:
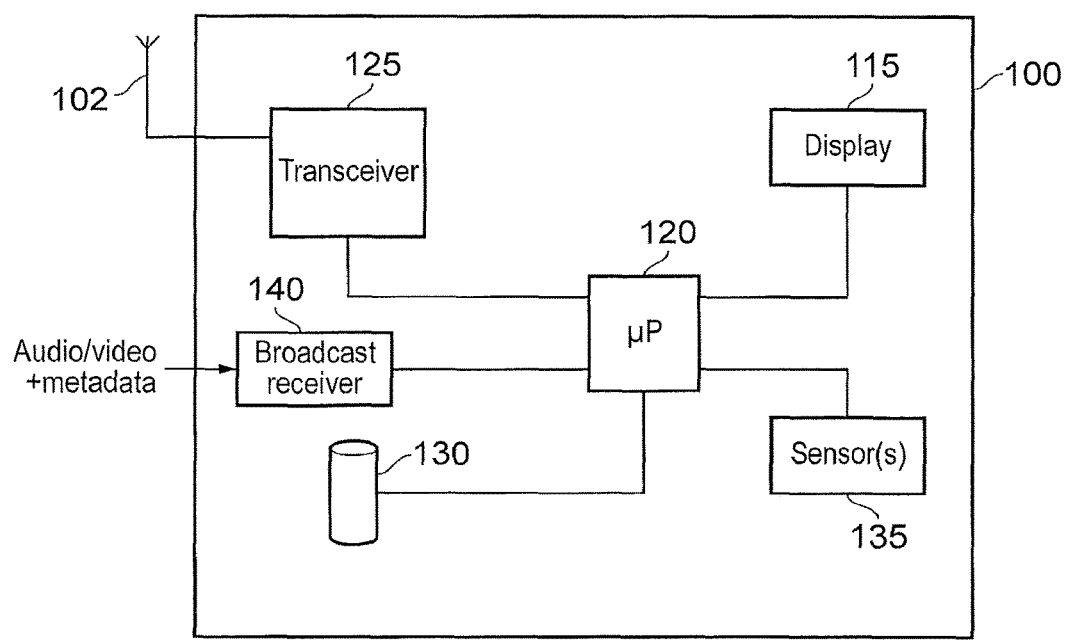
FIG. 2 shows an information processing apparatus according to embodiments of the disclosure.

Referring to FIG. 2, a block diagram of information processing apparatus 100 is shown. The antenna 102 is connected to transceiver circuitry 125. The transceiver circuitry 125 contains either a transmitter or a receiver or both a transmitter and receiver. The purpose of the transceiver circuitry 125 is to communicate data over the system 110 using antenna 102. This communication may be done using WiFi, Bluetooth, or the like.

The transceiver circuitry 125 is connected to controller circuitry 120. The controller circuitry 120 is a microprocessor type device whose functions and operations are controlled by software. Of course, the control circuitry 120 may be a Field Programmable Gate Array (FGPA), Application Specific Integrated Circuit (ASIC) or another type of hard wired control unit.

Also connected to the control circuitry 120 is storage 130. The storage may be a magnetically readable storage medium or a solid state storage medium. The storage medium, in this case, contains the software code which is used to control the control circuitry 120. Additionally, the storage 130 is used to store parameters defined either by the user or at manufacture in association with metadata received by the information processing apparatus 100. This will be explained later.

In embodiments of the disclosure, the information processing apparatus 100 is a smart television. Therefore, a broadcast receiver 140 is provided that receives audio and/or video multimedia data. This is broadcast data that includes metadata. The broadcast audio and/or video data may be sent using the digital video broadcast (DVB) standard which has provision to include metadata along with the content. The broadcast receiver 140 is connected to the control circuitry 120. The broadcast receiver 140 is configured to provide to the control circuitry 120 the received audio and/or video material and the metadata sent in association with the multimedia data.

A display 115 is also provided in information processing apparatus 100. This display is connected to the control circuitry 120. The display may be a touchscreen display that allows the user to interact with the information processing apparatus 100 by touch using either their finger or a touching object. Alternatively, the display 115 may not include a touchscreen. In this case, a user will be provided with a different mechanism by which to interact with the television such as a mouse, remote commander or the like.

Additionally connected to the control circuitry 120 is one or more sensor 135. The sensor 135 may include an accelerometer, gyroscope, GPS device or the like. The function of the sensor is to measure a physical parameter of the information processing apparatus 100 such as tilt or rotation or geographical position.

Figures 1, 3:
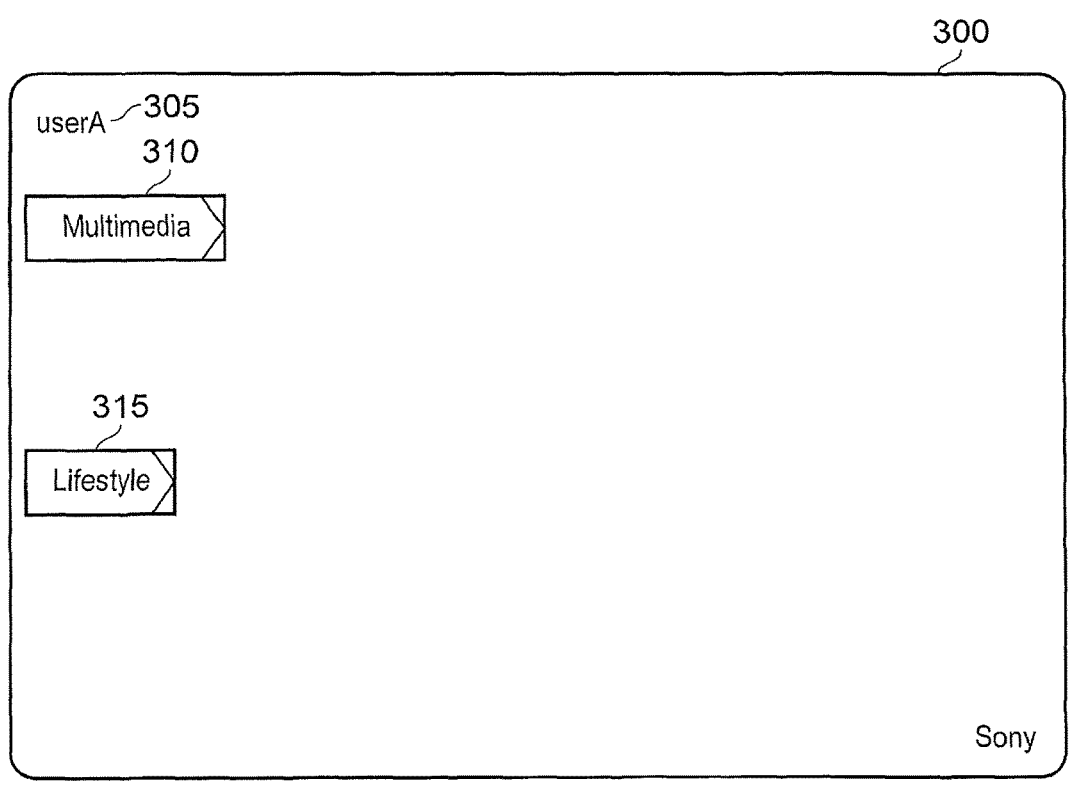
Figures 2, 3:
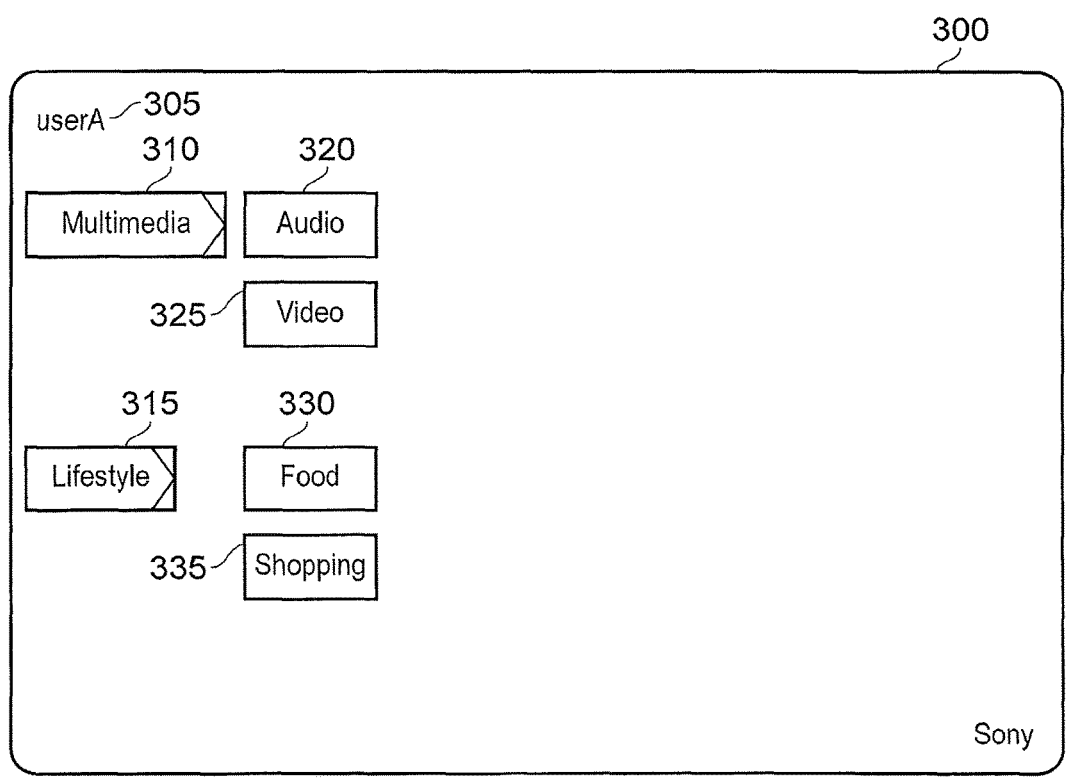
Figure 3:
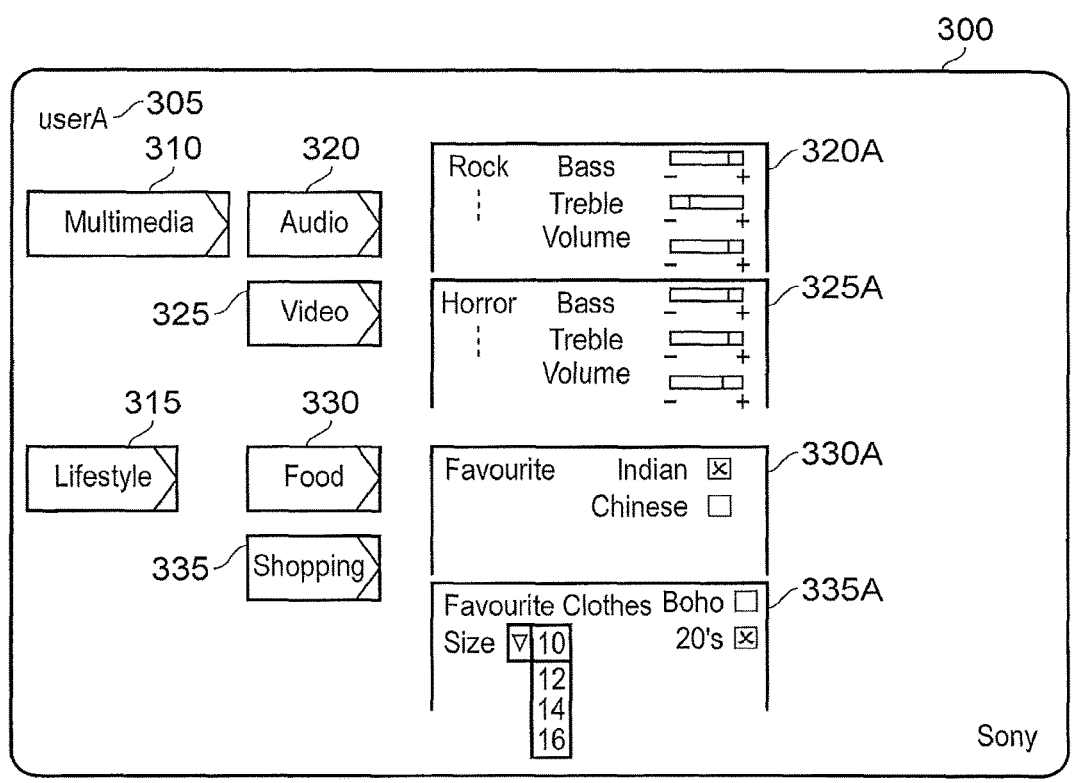

FIGS. 3-1 to 3-3 shows a setup screen that is used with information processing apparatus 100 to establish user preferences. These user preferences will be stored in storage 130. In example embodiments of the disclosure, the setup screen will be provided to the user on display 115 and the user interacts with the setup screen using a touchscreen type interface. Of course, the setup screen 300 may be provided on one of the other information processing apparatuses 100A-100C and the settings transferred to information processing apparatus 100 or hub 105. An example of this would be if the information processing apparatus 100 is a smart television and the user wishes to have the setup screen 300 displayed on a tablet or phone wirelessly connected to the television.

The setup screen 300 includes a user identity icon 305. This allows the information processing apparatus 100 to store preferences of several users' who may each use information processing apparatus 100. For example, in a family scenario where a household has four people who access the information processing apparatus 100 each person may have a specific profile linked to themselves. The user would then log in to the information processing apparatus 100 either using a unique identifier and a password or using facial recognition if one of the sensors within information processing apparatus 100 is a camera. Additionally, depending upon the particular characteristics of the user, different options in the setup screen 300 may be provided. For example, if a child of the household were to access the setup screen, they may have more limited choices compared to an adult.

Returning to FIG. 3-1, the user identity icon 305 may be a drop down menu whereby the user can be changed and, with appropriate authentication such as entering a password, different options may be provided on the user setup screen 300. In this example, user A has the ability to select parameters relating to multimedia and lifestyle. The user may control the multimedia options using multimedia drop-down menu 310 and may control the lifestyle options using the lifestyle dropdown menu 315.

Referring to FIG. 3-2, when a user selects multimedia dropdown menu 310, an audio drop down menu 320 and a video drop down menu 325 are provided. As the audio drop down menu 320 and the video drop down menu 325 are sub categories of the multimedia drop down menu 310, they are located adjacent to the multimedia drop down menu 310 for easy access by the user.

Similarly, if the user selects the lifestyle drop down menu 315, a food drop down menu 330 and a shopping drop down menu 335 are provided. Again, as the food drop down menu 330 and the shopping drop down menu 335 are sub categories of the life style drop down menu 315, the icons are provided adjacent the lifestyle menu 315.

Referring to FIG. 3-3, when a user activates the audio drop down menu 320, an audio settings menu 320A is provided. In the example shown in FIG. 3-3, settings associated with "rock" music is shown which defines the bass, treble and volume of the information processing apparatus 100 when the multimedia content is rock music. The user is free to select and change the bass, treble and volume settings on the sliding scale displayed. So, in the specific example, the user increases the audio property by sliding the bar to the right (toward the "+" symbol) and decreases the audio property by sliding the bar to the left (toward the symbol). Of course, although only "rock" music is shown, other types of music are envisaged such as "classic", "jazz" or any other type of music. This allows the user to select different musical parameters depending on the genre of the music.

If the user activates the video drop down menu 325, a video setting menu 325A is provided. In example embodiments, the video genre is "horror" and the bass, treble and volume of the audio associated with the video can be changed using the slide bars. Although "honor" is shown, other genres of video are envisaged such as "action movies", "romantic movies" or the like. Moreover, although the video settings 325A are shown as selecting certain audio features associated with the horror movies, video settings such as luminesce, or brightness may equally be set so that the video parameters of the information processing apparatus 100 can be changed depending upon the genre of the video. The genre of the received audio/video/multimedia content is provided by received metadata that is associated with the content. This metadata may be sent with the multimedia content or separate to the content.

If the user selects the food drop down menu 330, food favourite settings 330A are displayed. These indicate to the user different types of cuisine such as Indian cuisine, Chinese cuisine or the like. The user can then select their favourite types of food using the check box located next to the type of cuisine. Additionally, in the food settings 330A, the user may indicate any allergies such as nuts or eggs and may also include any preferred alternative types of food. For example, many people cannot drink cow's milk but enjoy soy milk. Therefore, soy milk is often swapped for cow's milk and this alternative can be included in the food setting 330A. Of course, other allergies may be defined in this settings box and other alternatives may also be defined.

If the user selects the shopping drop down menu 335, clothes settings 335A are displayed. This may indicate the user's favourite type of clothes such as boho style or 1920 style clothes. These may be selected by the check box. Additionally, user information such as the waist size or neck size of a male user or the dress size of a female user may also be selected using the clothes settings. In this case, the user is a female user size UK 10. The types of favourite may be selected by the user depending upon their gender for example, for a female user, the clothes styles may include dresses whereas for a male user, the clothes types may include formal shirts. These gender specific clothing selections may be provided to the information processing apparatus 100 automatically by the hub 115 or over the Internet or the like.

Figure 4:
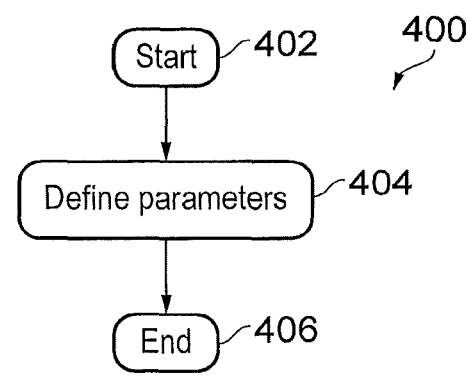
FIG. 4 shows a flowchart setting parameters in the information processing apparatus of FIG. 2.

Referring to FIG. 4, a flow chart 400 showing the user set up is shown. The process starts at step 402. Then, the display screen 300 as noted in FIGS. 3-1 to 3-3 is shown in step 404. The user defines the parameters to be associated with their profile and displayed on the information processing apparatus 100 during this step. If no user selected parameters are provided, it is envisaged that a default selection may be provided. These default parameters may be defined during manufacture and may also depend on characteristics of the user, such as age, gender or the like. After the parameters have been defined, the process ends at step 406.

After the parameters have been defined, the system may be used with content and the associated metadata. As noted above, the metadata may be sent with the content or may be sent separately. For example, the metadata may be sent in the DVB video stream or may be sent separately over the Internet or the like. The use of the system will be described in respect of FIGS. 5 to 7.

Figure 5:
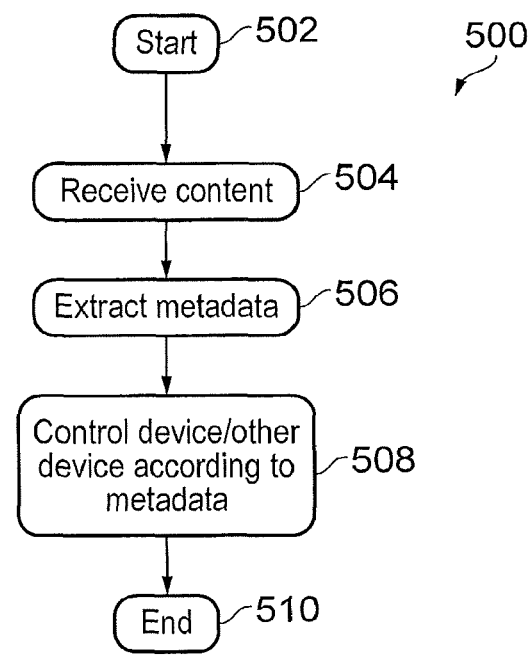
FIG. 5 shows a flowchart explaining a first use case.

Referring to FIG. 5, a first use case 500 is defined. The process starts step 502. The information processing apparatus 100 receives multimedia content 504. In the example of the information processing apparatus being a television as depicted in FIG. 2, the multimedia content is, in embodiments, received by the broadcast receiver 140. The multimedia content includes metadata that is associated with the content. The metadata may be genre information which describes the genre of the received multimedia content. For example, if the multimedia content is a horror movie, the broadcast genre may be "horror movie". Alternatively or additionally, the metadata may include the time of day of a particular received multimedia program. This, typically, is Electronic Program Guide information and defines when in the future certain programs will be broadcast. Alternatively or additionally, metadata may relate specifically to the content of the multimedia content. This is sometimes referred to as semantic metadata. For example, if the multimedia content is a cookery program, the metadata may include ingredient information of the meal that is being prepared in the cookery program. Alternatively, the metadata may be temperature settings on an oven or may include measurement information of a specific recipe ingredient. For example, if the multimedia content is a cookery program and they are baking a cake, then specific weights of the ingredients may also be included in the metadata. In this case, alternatives which may be used may also be included. For example, where flour is used in a recipe, the metadata may specify that gluten free flour is an alternative. Similarly, yoghurt may replace cream in a particular recipe. This information may be provided in the metadata. Of course, the alternatives may be provided by the information processing apparatus 100. As an example, the information processing apparatus 100 may appreciate that yoghurt is an alternative for cream. Therefore, if the metadata specifies cream, the information processing apparatus 100 may replace cream with yoghurt automatically. This may be automatically applied or may be a search option provided to the user.

Other features of the metadata in the embodiment where the multimedia content is a cookery program may include a spiciness rating associated with the menu being created. For example, if the recipe is particularly spicy, this may be indicated in the metadata. Other information such as whether the recipe is of high protein or low carbohydrate containing meal may also be included as this could be useful to the consumer.

Referring back to FIG. 5, after the multimedia content has been received in step 504, the metadata is extracted in step 506. This will be done by the broadcast receiver 140.

The broadcast receiver 140 passes the multimedia content and separately the metadata to the control circuitry 120. The multimedia content is displayed on the display 115 and the audio is provided to speakers (not shown). The metadata is then compared to the metadata stored in the storage 130 that is associated with the user. In particular, if the multimedia content is a honor film, the genre information will be provided in the metadata and this will be compared with the horror settings 325A defined by the user. The bass, treble and volume settings will be extracted at this stage and the bass, treble and volume of the information processing apparatus 100 will be set. In other words, certain parameters of the information processing apparatus 100 will be set depending upon the genre of the received multimedia content. This allows the information processing apparatus 100 to be controlled based upon the received metadata.

Moreover, the information processing apparatus 100 may also transmit control information to one of the other information processing apparatus 100A-100C. This transmission of control information would be performed using the transceiver 125. In particular, in the event that the received multimedia content is of a horror genre the user may define other actions to be taken by the remaining information processing apparatus 100A-100C in response to the genre being horror. Specifically, the horror settings 325A may include other actions such as the curtains being closed or the lights being dimmed if the genre is horror. In this case, the controller circuitry 120 will send to the other information processing apparatus 100B a control signal to close the curtains and a second control signal to the other information processing apparatus 100C to dim the lights.

This allows the user the ability to control the other devices based upon the metadata received by the broadcast receiver 140. This is step 508.

The process then ends in step 510.

Figure 6:
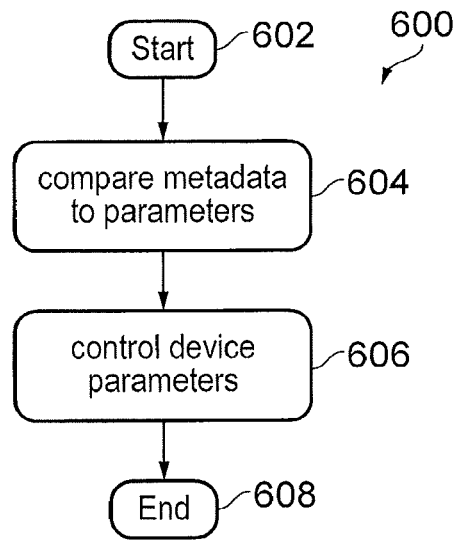
FIG. 6 shows a flowchart explaining a second use case.

Referring to FIG. 6, a flow chart representing step 508 of FIG. 5 in more detail is shown. In particular, the process starts in step 602. The control circuitry 120 then compares the metadata to the stored parameters in step 604. Of course, although this step (and other steps in the disclosure) use the term "compares", checking, corresponding, depending or other similar phrases are envisaged.

The control device parameters, sometimes referred to simply as "parameters", are extracted in step 606 and are used to either control the information processing device 100 or the other information processing devices 100A-100C and then the process ends in step 608. A number of other use cases will now be described to illustrate the advantages of the current disclosure.

If a user sets a reminder in the EPG of the information processing device 100, the user may be provided with a set up screen similar to that of set up screen 300 in FIG. 3-1. However, in this case, the set up screen may offer certain functions to be provided when the metadata indicates that the multimedia content is this particularly set program. In other words, the set-up screen allows the user to define in advance for specific programs control various parameters so that certain functions are performed when the program is actually received by the information processing apparatus. For example, when the program is received, the user may be provided with the option to set an alarm clock on a smartphone or a connected alarm clock which has IoT functionality. This allows the user to be notified that a desired program is about to start.

Other functions may also be performed. For example, when a particular program is received, the lights in a particular room may be set to come on. In other words, when the metadata indicates that a certain program is contained in the multimedia content, the information processing apparatus 100 will issue control parameters to other devices. These parameters are issued according to instructions and settings stored within the information processing apparatus 100.

Other scenarios are envisaged such as the central heating in the house may be switched on in advance of the received program or a coffee machine may be activated when the multimedia program is the desired content or, indeed, the washing machine or tumble dryer or dishwasher may be paused in order to reduce background noise.

In addition, the dynamic range of the information processing apparatus 100, or a connected external audio amplifier may be changed depending upon the nature of the desired program. For example, in the event that the desired program is received in the early hours of the morning when other users are asleep, the volume may be automatically reduced dramatically so as not to disturb the other residents of the house.

In the event that a user is browsing the internet using the information processing apparatus 100, the metadata received may indicate that the information processing apparatus is connected to the Internet. In this case, the information processing apparatus may indicate to the user the option of listening to ambient music defined in the set up process explained in relation to FIG. 3.

In the event that the user is listening to music multimedia content, the user could indicate to the information processing apparatus 100 that he is interested the current track or the current artist. In this case, the metadata that is extracted from the multimedia content associated with the particular track or artist, may control the information processing apparatus 100 to watch the video of that track or other tracks from that artist on another information processing apparatus 100A-100C. For example, if a user's smartphone communicates with information processing apparatus 100, the information processing apparatus 100 may send to the smartphone a link within a content search service such as You Tube which would allow the smartphone to access a video of the artist performing the track or other videos of the artist performing similar tracks. Indeed, if the information processing apparatus 100 was connected to a dedicated music system, the user indicating that he or she liked a particular artist or track would enable the music system to download a high fidelity version of the track or tracks associated with the artist and play those tracks directly on the music system for better quality reproduction. The information processing apparatus may be configured to turn off once the music has been transferred to the connected music system.

In a further embodiment, metadata may be provided along with the multimedia content (or separately to the multimedia content) to indicate that a particular emergency situation has occurred. For example, in areas of the world where earthquakes occur, the multimedia content metadata may include an early warning detection such as the DVB Emergency Warning System or the United States Emergency Alert System. In this case, the information processing apparatus 100 may instruct another information processing apparatus 100A-100C to perform certain functions. For example, the information processing apparatus 100 may instruct a connected alarm clock to activate immediately thus waking the user and allowing them to retreat to safety. Alternatively or additionally, room lights may be turned on using information processing apparatus 102C and the curtains may be drawn by activating information processing apparatus 100B. In other words, if the received metadata indicates an emergency, certain connected devices will be activated to perform certain functions in order to ensure the safety of the user.

Figure 7:
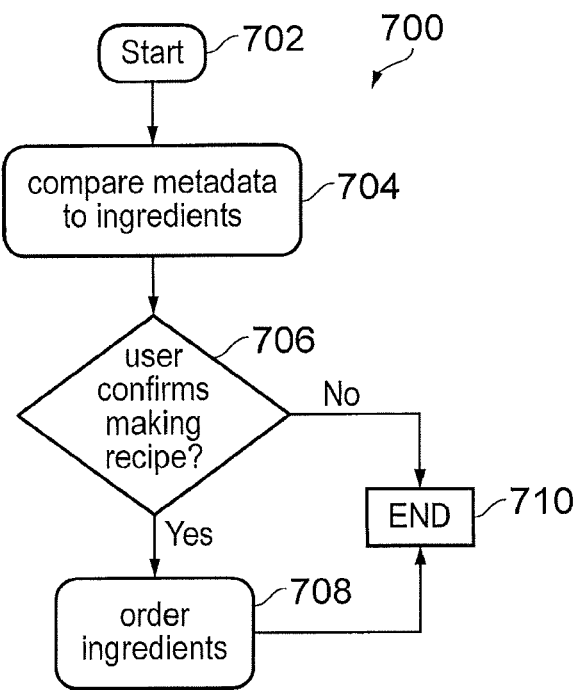
FIG. 7 shows a flowchart explaining a third use case.

Referring now to FIG. 7, a different use case 700 is provided. In this case, the multimedia content is a cookery program on information processing apparatus 100. In this case, the metadata is recipe information relating to the cookery program. For example, the metadata may include a list of ingredients or specific alternatives that may be used in the recipe. Of course, the alternatives may be provided by the information processing apparatus 100. For example, ghee is sometimes replaced with cream or yoghurt. These alternatives may be stored within the information processing apparatus 100. The metadata may also include weights and measures of the certain ingredient types as well as a spice rating associated with the spiciness of a particular recipe. Other category information such as the type of cuisine or whether the recipe is a high protein or low carbohydrate recipe or even a high fat recipe is provided in the metadata.

The metadata associated with the cookery program is then compared with the food settings 330A. In the food settings associated with a particular user, the user may define a certain type of cuisine as being a favourite and so that recipe may be stored. Alternatively, the user may define that any recipe that is from a favourite cuisine will be made by the user. In this case, the control circuitry 120 extracts ingredient metadata and the measurement metadata and send this to, in this case, the food receptacle 100A. The food receptacle will then compare the list of ingredients provided by the control circuitry 120 with its contents and determine whether the user has all the ingredients to make a particular recipe. If the user does have all the ingredients, the user may be notified either on the display of information processing apparatus 115 or on another information processing apparatus. If one or more ingredients is not present in sufficient quantity, the other information processing apparatus 100A, may order (either automatically or via prompt to the user) the missing ingredient. This will be done automatically. Of course, the information processing apparatus 100A may suggest alternative ingredients that are located in the food receptacle.

Additionally, the user may be requested to confirm whether they wish to make a particular recipe. In this case, as the user is watching the cookery program, they may be prompted to indicate whether they wish to make a particular recipe. If the user does wish to make a particular recipe, the ingredient metadata and the measurement metadata is then extracted from the multimedia content and sent to the food receptacle 100A. The food receptacle 100A checks the contents of the food receptacle to ensure that sufficient quantities of the desired ingredients are present. If not, the missing ingredient(s) is ordered. Of course, the information processing apparatus 100A may suggest alternative ingredients that are located in the food receptacle.

Indeed, the food receptacle or the information processing apparatus, may simply order the ingredients if a user likes a particular recipe without checking the current contents of the food receptacle. This use case is set out in FIG. 7 briefly explained below.

Referring to FIG. 7, a flow chart 700 is shown. The flow chart starts at 702. The metadata is compared to the ingredients stored within the user profile 330A. In this case, alternative ingredients may be provided to the food receptacle 100A. For example, if the user desires that cream be replaced by yoghurt, if the ingredients provided in the metadata of the program states that cream should be used, the alternative of yoghurt is provided to the food receptacle 100A instead of the instructed cream.

In step 706, the user states whether they are to make the recipe or not. This may be done by prompting the user or may be done automatically if the user has selected that they will make any recipes which are a favourite. If the user does not indicate they wish to make the recipe, the process ends at step 710. However, if the user indicates that they will make the recipe, the yes path is followed and the ingredients are ordered in step 708. The ingredients may be ordered from an online store or may be compared to the ingredients stored in the food receptacle 100A and may be re-ordered if necessary. The process then ends at step 710.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the disclosure can generally be defined according to the following numbered paragraphs.

1. An information processing apparatus comprising:
receiver circuitry configured to receive content including metadata;
storage containing a parameter associated with the metadata; and
control circuitry configured to: extract the received metadata; retrieve the parameter associated with the metadata and control the information processing apparatus based on the parameter.

2. An information processing apparatus comprising:
receiver circuitry configured to receive content including metadata;
storage containing a parameter associated with the metadata;
transceiver circuitry configured to transmit the parameter to a second information processing apparatus and
control circuitry configured to: extract the received metadata; retrieve the parameter associated with the metadata and transmit the parameter to the second information processing apparatus.

3. An information processing apparatus according to paragraph 1, wherein the content is multimedia content, the metadata including genre information relating to the multimedia content and the parameter is an audio and/or video setting of the information processing device.

4. An information processing apparatus according to paragraph 2, wherein the content is multimedia content associated with a cookery program, the metadata including ingredient information relating to the cookery program and the parameter is an ingredient.

5. An information processing apparatus according to paragraph 4, wherein the parameter is an alternative to the ingredient information relating to the cookery program.

6. A food storage receptacle comprising memory configured to store a database of food located in the storage receptacle, transceiving circuitry configured to receive the parameter from the information processing apparatus of paragraph 4 and control circuitry configured to compare the parameter with the database of food, whereby the control circuitry is configured so that when a negative comparison is made, a notification is sent, via the transceiving circuitry to the information processing device.

7. An information processing apparatus according to paragraph 2, wherein the content is multimedia content, the metadata including time information relating to the time of broadcast of the multimedia content and the parameter is a power signal switching on the second information processing apparatus at the time of the broadcast.

8. An information processing apparatus according to paragraph 1, wherein the content is multimedia content, the metadata including information relating to the creator of the multimedia content and the parameter retrieves other content from the creator.

9. An information processing apparatus comprising:
receiver circuitry configured to receive an early warning message;
storage containing a parameter associated with the early warning message;
transceiver circuitry configured to transmit the parameter to a second information processing apparatus and
control circuitry configured to: retrieve the parameter associated with the early warning message and transmit the parameter to the second information processing apparatus.

10. An information processing method comprising:
receiving content including metadata;
storing a parameter associated with the metadata;
extracting the received metadata; and retrieving the parameter associated with the metadata and control the information processing apparatus based on the parameter.

11. An information processing method comprising:
receiving content including metadata;
storing a parameter associated with the metadata;
transmitting the parameter to a second information processing apparatus;

extracting the received metadata; retrieving the parameter associated with the metadata and transmitting the parameter to the second information processing apparatus.

12. An information processing method according to paragraph 10, wherein the content is multimedia content, the metadata including genre information relating to the multimedia content and the parameter is an audio and/or video setting.

13. An information processing method according to paragraph 11, wherein the content is multimedia content associated with a cookery program, the metadata including ingredient information relating to the cookery program and the parameter is an ingredient.

14. An information processing method according to paragraph 13, wherein the parameter is an alternative to the ingredient information relating to the cookery program.

15. A food storage method comprising storing a database of food located in a storage receptacle, receiving the parameter from the information processing apparatus of paragraph 13 and comparing the parameter with the database of food, whereby when a negative comparison is made, a notification is sent to the information processing device.

16. An information processing method according to paragraph 11, wherein the content is multimedia content, the metadata including time information relating to the time of broadcast of the multimedia content and the parameter is a power signal switching on the second information processing apparatus at the time of the broadcast.

17. An information processing method according to paragraph 10, wherein the content is multimedia content, the metadata including information relating to the creator of the multimedia content and the parameter retrieves other content from the creator.

18. An information processing method comprising:
receiving an early warning message;
storing a parameter associated with the early warning message;
transmitting the parameter to a second information processing apparatus and
retrieving the parameter associated with the early warning message and transmitting the parameter to the second information processing apparatus.

19. A computer program containing computer readable instructions which, when loaded onto a computer, configure the computer to perform a method according to claim 10.

20. A computer program product configured to contain the computer program of claim 19 therein or thereon.

The invention claimed is:

1. An information processing apparatus comprising:
a memory configured to store a setting associated with metadata; and
circuitry configured to
receive multimedia content including the metadata,
extract the received metadata,
retrieve the setting associated with the metadata,
control an operational parameter of the information processing apparatus based on the setting, and
transmit a control signal to a second information processing apparatus different from the information processing apparatus, the control signal instructing the second information processing apparatus to adjust an operational parameter of the second information processing apparatus associated with the setting, which is associated with the received metadata included in the received multimedia content and stored at the information processing apparatus.

2. The information processing apparatus according to claim 1, wherein the metadata includes genre information relating to the multimedia content and the setting is an audio and/or video setting of the information processing device.

3. The information processing apparatus according to claim 1, wherein the content is multimedia content is associated with a cookery program, the metadata including ingredient information relating to the cookery program and the setting being associated with an ingredient.

4. The information processing apparatus according to claim 3, wherein the setting is associated with an alternative to the ingredient information relating to the cookery program.

5. A food storage receptacle comprising:
a memory configured to store a database of food located in the food storage receptacle; and
receptacle circuitry configured to
receive the setting from the information processing apparatus of claim 3,
compare the setting with the database of food, and
when a negative comparison is made, send a notification to the information processing apparatus.

6. The information processing apparatus according to claim 1, wherein the metadata includes time information relating to time of broadcast of the multimedia content and the control signal instructs a power signal switching on the second information processing apparatus at the time of the broadcast.

7. The information processing apparatus according to claim 1, wherein the metadata includes information relating to a creator of the multimedia content and the control signal instructing retrieval of other content from the creator.

8. The information processing apparatus according to claim 1, wherein the setting is related to lifestyle.

9. An information processing method for an information processing apparatus, the information processing method comprising:
receiving, by the information processing apparatus, multimedia content including metadata;
storing, by the information processing apparatus, a setting associated with the metadata;
extracting, by the information processing apparatus, the received metadata;
retrieving, by the information processing apparatus, the setting associated with the metadata;
controlling, by the information processing apparatus, an operational parameter of the information processing apparatus based on the setting; and
transmitting, by the information processing apparatus, a control signal to a second information processing apparatus different from the information processing apparatus, the control signal instructing the second information processing apparatus to adjust an operational parameter of the second information processing apparatus associated with the setting, which is associated with the received metadata included in the received multimedia content and stored at the second information processing apparatus.

10. The information processing method according to claim 9, wherein the metadata includes genre information relating to the multimedia content and the setting is an audio and/or video setting.

11. The information processing method according to claim 9, wherein the multimedia content is associated with a cookery program, the metadata including ingredient information relating to the cookery program and the setting being associated with an ingredient.

12. The information processing method according to claim 11, wherein the setting is associated with an alternative to the ingredient information relating to the cookery program.

13. A food storage method comprising:
  storing a database of food located in a storage receptacle;
  receiving the setting transmitted by the transmitting of claim 11;
  comparing the setting with the database of food; and
  when a negative comparison is made, sending a notification to the information processing device.

14. The information processing method according to claim 9, wherein the metadata includes time information relating to the time of broadcast of the multimedia content and the control signal instructing a power signal switching on the second information processing apparatus at the time of the broadcast.

15. The information processing method according to claim 9, wherein the metadata includes information relating to a creator of the multimedia content and the control signal instructing retrieval of other content from the creator.

16. The information processing method according to claim 9, wherein the setting is related to lifestyle.

17. A non-transitory computer-readable storage medium including computer executable instructions, wherein the instructions, when executed by an information processing apparatus, cause the information processing apparatus to perform a method, the method comprising:
  receiving multimedia content including metadata;
  storing a setting associated with the metadata;
  extracting the received metadata;
  retrieving the setting associated with the metadata;
  controlling an operational parameter of the information processing apparatus based on the setting; and
  transmitting a control signal to a second information processing apparatus different from the information processing apparatus, the control signal instructing the second information processing apparatus to adjust an operational parameter of the second information processing apparatus associated with the setting, which is associated with the received metadata included in the received multimedia content and stored at the second information processing apparatus.

18. The non-transitory computer-readable storage medium according to claim 17, wherein the setting is related to lifestyle.

* * * * *